(12) United States Patent  
Siow et al.

(10) Patent No.: US 8,781,438 B2
(45) Date of Patent: Jul. 15, 2014

(54) MANAGING NON-VOICE EMERGENCY SERVICES IN A WIRELESS COMMUNICATION NETWORK

(71) Applicant: Intel Corporation, Santa Clara, CA (US)

(72) Inventors: Eric Siow, Beaverton, OR (US); Muthaiah Venkatachalam, Beaverton, OR (US); Puneet K. Jain, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/684,131

(22) Filed: Nov. 21, 2012

(65) Prior Publication Data

US 2014/0141742 A1  May 22, 2014

(51) Int. Cl.
H04M 11/04 (2006.01)
H04W 4/00 (2009.01)

(52) U.S. Cl.
USPC ...................... 455/404.1; 455/412.1; 455/466

(58) Field of Classification Search
None
See application file for complete search history.

(56) References Cited

U.S. PATENT DOCUMENTS 5,937,355 A * 8/1999 Joong et al. .................... 455/466
2004/0224682 A1 11/2004 Kang
2008/0081646 A1 4/2008 Morin et al.
2010/0099376 A1 * 4/2010 Ray et al. ................... 455/404.2
2011/0065416 A1 3/2011 Burt et al.
2011/0189971 A1 * 8/2011 Faccin et al. ............... 455/404.1
2012/0237002 A1 9/2012 Sennett et al.

FOREIGN PATENT DOCUMENTS

WO WO 2009/100291 A1 8/2009

OTHER PUBLICATIONS

International Search Report and Written Opinion mailed Oct. 24, 2013 from International Application No. PCT/ US2013/047362.

* cited by examiner

Primary Examiner — Erika A Washington
(74) Attorney, Agent, or Firm — Schwabe, Williamson & Wyatt, P.C.

(57) ABSTRACT

A user equipment (UE) may send a non-voice emergency services (NOVES) message to a public safety access point (PSAP). If the UE does not receive an acknowledgement that the PSAP received the NOVES message, the UE may buffer the NOVES message and periodically re-transmit the NOVES message. The NOVES message may include a counter value that is incremented with each successive transmission. The PSAP may recognize if the counter value is greater than an initial value, and determine if the PSAP or another PSAP has received the NOVES message previously. In some embodiments, the UE may change an interval between re-transmissions if the UE receives a partial acknowledgement from an operator network indicating that the operator network has received the NOVES message but that the PSAP is unavailable. Embodiments also provide an emergency module hosted at the operator network to store and forward the NOVES message to the PSAP.

22 Claims, 8 Drawing Sheets

MANAGING NON-VOICE EMERGENCY SERVICES IN A WIRELESS COMMUNICATION NETWORK

FIELD

Embodiments of the present invention relate generally to the field of communications, and more particularly, to non-voice emergency services in a wireless communication network.

BACKGROUND

Some wireless communication networks support the use of non-voice emergency services (NOVES). A user equipment (UE) sends a NOVES message, including emergency data such as text, audio, or video, to a public safety access point (PSAP). The NOVES message is forwarded to the PSAP through an operator network by an evolved Node B (eNB) of the operator network. However, the NOVES message may not always be successfully received by the PSAP, for example if the operator network or the PSAP is unavailable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, and apparatuses for managing non-voice emergency services in a wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
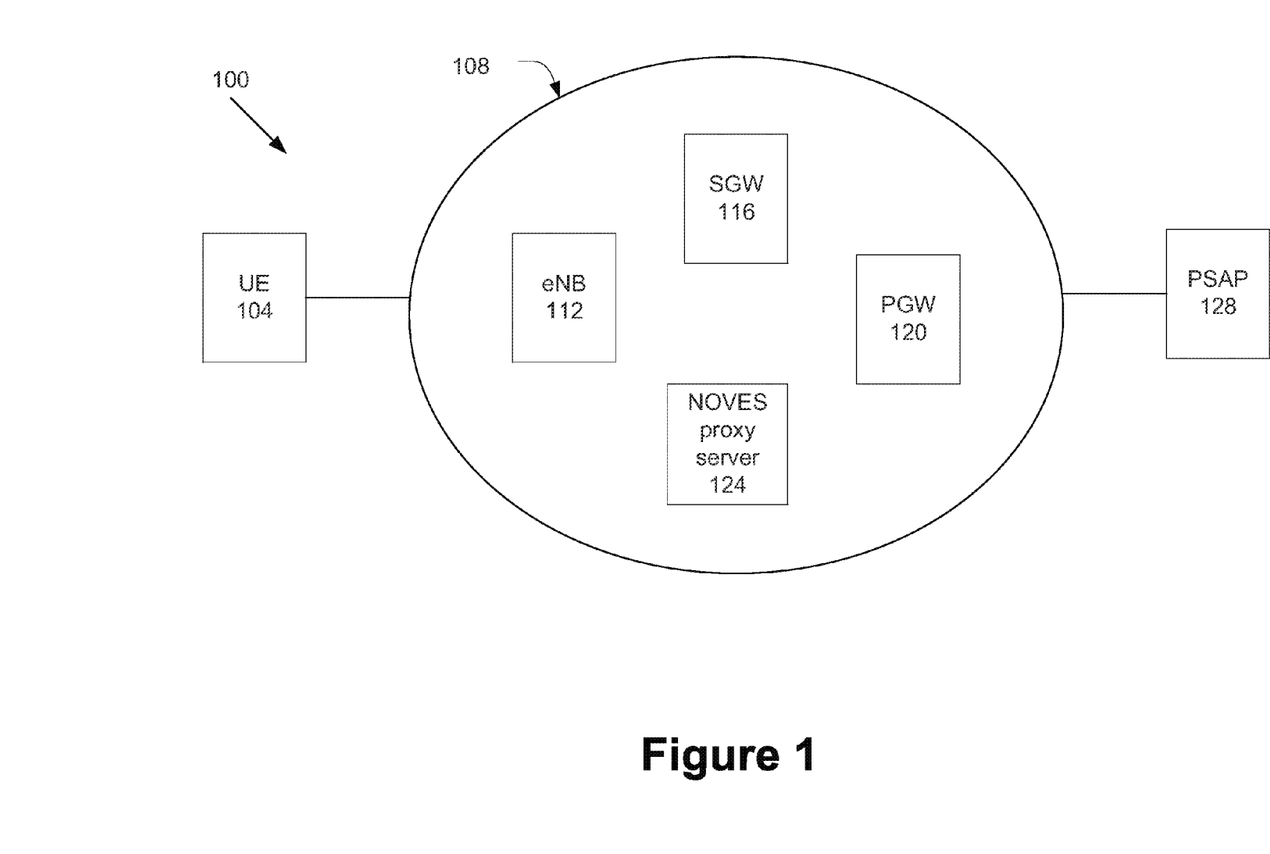
FIG. 1 is a block diagram illustrating wireless communication network in accordance with various embodiments.

FIG. 1 schematically illustrates a wireless communication network 100 in accordance with various embodiments. Wireless communication network 100 may include a user equipment (UE) 104 configured to wirelessly communicate with an operator network 108. Operator network 108 may be an access network of a 3rd Generation Partnership Project (3GPP) long-term evolution advanced (LTE-A) network such as evolved universal mobile telecommunication system (UMTS) terrestrial radio access network (E-UTRAN). Operator network 108 may include a base station, e.g., enhanced node base station (eNB) 112, configured to wirelessly communicate with UE 104. The operator network 108 may further include a serving gateway (SGW) 116 and a packet data network gateway (PGW) 120. The eNB 112 may route communications between the UE 104 and a remote server and/or other network through the SGW 116 and/or PGW 120. In some embodiments, the operator network 108 may further include a non-voice emergency services (NOVES) proxy server 124. Other embodiments of the operator network 108 may not include a NOVES proxy server 124.

In various embodiments, the wireless communication network 100 may further include a public safety access point (PSAP) 124. The PSAP 124 may be configured to receive non-voice emergency services (NOVES) messages from UEs in the network 100 (e.g., UE 104). The PSAP 124 may receive the NOVES messages via the operator network 108. The PSAP 124 may communicate with the operator network 108 via a wireless and/or wired connection. The PSAP 124 may be included in a public safety network that includes one or more other PSAPs (not shown). For example, different PSAPs may provide service in different coverage areas (e.g., for UEs and/or eNBs in different locations).

Figure 2:
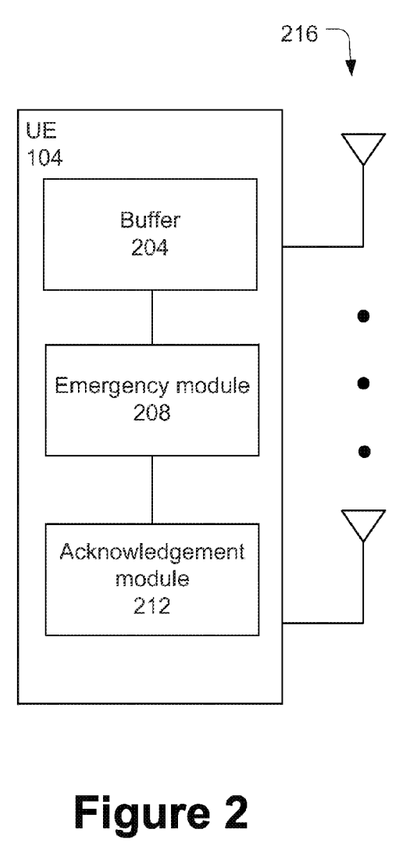
FIG. 2 is a block diagram illustrating a user equipment in accordance with various embodiments.

As shown in FIG. 2, the UE 104 may include a buffer 204, an emergency module 208, and an acknowledgement module 212 coupled to one another at least as shown. The UE 104 may further include one or more antennas 216 for communicating over the wireless communication network 100.

In various embodiments, the emergency module 208 may transmit, over the wireless communication network 100, a NOVES message that is intended for the PSAP 128. The NOVES message may be transmitted to the PSAP 128 via the operator network 108 (e.g., via eNB 112).

The NOVES message may include emergency data associated with an emergency situation. For example, the emergency data may include one or more bits, text, audio, photo, video, and/or other data associated with the emergency situation. The audio or video may be recorded audio or video data, respectively. Accordingly, the NOVES message may be contrasted from a live voice or video call. The emergency data may further include other data and/or metadata associated with the UE 104, such as a unique identifier associated with the UE 104 (e.g., a phone number, medium access control (MAC) address, internet protocol (IP) address, etc.), location data associated with the UE 104, and/or data related to a registered user of the UE 104 (e.g., the identity of the registered user).

In some embodiments, the UE 104 may produce a generic NOVES message when prompted by the user, for example by pressing a dedicated emergency button and/or initiating a NOVES message on a display of the UE 104. The generic NOVES message may include one or more bits indicating that an emergency situation is present. Alternatively, or additionally, the user may provide other emergency data for the NOVES message, such as text, audio, photo, and/or video data.

In various embodiments, the NOVES message may include a counter value indicating a number of times the NOVES message has been transmitted by the UE 104. In some embodiments, the counter value may be included in a header and/or sub-header of the NOVES message. The counter value may have an initial value (e.g., 0 or 1) to indicate that the NOVES message is being transmitted for the first time. The counter value may be incremented from the initial value for subsequent transmissions of the NOVES message.

In various embodiments, the PSAP 128 may transmit an acknowledgement (ACK) to the UE 104 if the PSAP 128 receives the NOVES message. However, there may be situations in which the PSAP 128 does not receive the NOVES message. For example, the operator network 108 and/or PSAP 128 may be unavailable, such as if the operator network 108 is busy and/or overloaded due to high network traffic and/or other conditions, and/or if the UE 104 is in an area with poor coverage or no coverage by the operator network 108.

In various embodiments, the acknowledgement module 212 may determine that an ACK has not been received for the NOVES message, and may notify the emergency module 208. For example, the acknowledgement module 212 may monitor for an ACK for the NOVES message, and may notify the emergency module 208 if an ACK has not been received within a time interval from the transmission of the NOVES message.

The emergency module 208 may store the NOVES message in the buffer 204. In some embodiments, the NOVES message may be stored in the buffer 204 in response to the determination that the ACK has not been received. In other embodiments, the emergency module 208 may proactively store the NOVES message in the buffer 204 prior to the determination that the ACK has not been received. In some embodiments, the buffer 204 may be included in the radio resource control (RRC), non-access stratum (NAS), or application layer of the UE 104.

In response to the determination that the ACK has not been received, the emergency module 208 may increment the counter value of the NOVES message (e.g., from n to n+1), and may re-transmit the NOVES message with the incremented counter value over the wireless communication network. For example, the first time the UE 104 transmits the NOVES message, the counter value may have the initial value indicating that the NOVES message is being transmitted for the first time. If the UE 104 does not receive an ACK from the PSAP 128, the UE 104 may re-transmit the NOVES message with a counter value incremented from the initial value to indicate that the NOVES message is being transmitted for the second time.

The emergency module 208 may continue to periodically re-transmit the NOVES message, incrementing the counter value of the NOVES message with each subsequent re-transmission, until an ACK is received from the PSAP 128. The re-transmitted NOVES message may include substantially the same content as the previously transmitted NOVES message apart from the incremented counter value.

In some embodiments, the counter value may have a maximum value (e.g., based on a number of bits of the counter value). The UE 104 may or may not continue to re-transmit the NOVES message once the maximum value of the counter value is reached. In some embodiments, if the counter value is incremented to the maximum value, re-transmissions of the NOVES message subsequent to the counter value having the maximum value may also include the maximum value of the counter value. In other embodiments, the UE 104 may cease re-transmissions of the NOVES message after counter value is incremented to the maximum value (and after transmitting the NOVES message with the counter value incremented to the maximum value).

In various embodiments, if the acknowledgement module 212 receives an ACK from the PSAP 128, the emergency module 208 may purge the NOVES message from the buffer 204 in response to the receipt of the ACK by the acknowledgement module 212.

In some embodiments, the UE 104 may stop re-transmissions of the NOVES message prior to receiving an ACK from the PSAP 128. For example, in some embodiments the user may indicate to the UE 104 that the emergency situation has been resolved. In that case, the UE 104 may stop further re-transmissions of the NOVES message.

Figure 3:
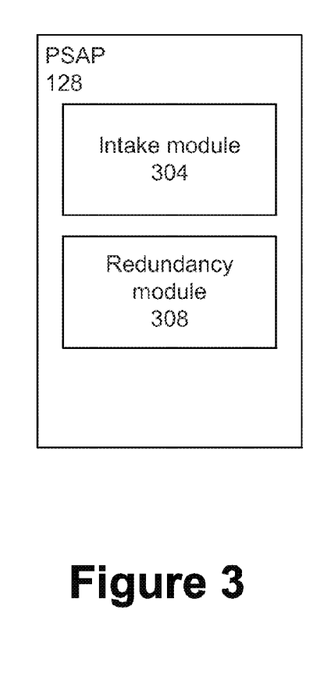
FIG. 3 is a block diagram illustrating a public safety access point in accordance with various embodiments.

As shown in FIG. 3, the PSAP 128 may include an intake module 304 and a redundancy module 308 coupled to one another. The intake module 304 may receive a NOVES message from the UE 104 having a counter value as described herein. The redundancy module 308 may detect that the counter value is greater than the initial value. Thus, the redundancy module 308 may determine that the UE 104 has previously transmitted the NOVES message. The redundancy module 308 may determine if the NOVES message has been previously received by the PSAP 128 or another PSAP based on the detection that the counter value is greater than the initial value. For example, the redundancy module 308 may search for a NOVES message having the same emergency data but with a lower counter value. The redundancy module 308 may determine if another PSAP has received the NOVES message by, for example, checking a record of one or more surrounding PSAPs (e.g., a PSAP associated with a neighboring region).

In some embodiments, the PSAP 128 may further determine if an emergency response team has previously been activated in response to the NOVES message. The PSAP 128 may activate an emergency response team based on a determination that the NOVES message has not been previously received by the PSAP 128 and/or another PSAP and/or based on a determination that an emergency response team has not previously been activated for the NOVES message. The PSAP 128 and/or the emergency response team may remain in contact with the UE 104 and/or the user. For example, in some embodiments, the PSAP 128 and/or emergency response team may track the location of the UE 104.

The PSAP 128 may further transmit an ACK to the UE 104 to indicate that the PSAP 128 has received the NOVES message.

Accordingly, the storing and re-transmission of the NOVES message may facilitate successful receipt of the NOVES message by the PSAP 128 in situations in which the first transmission of the NOVES message is not successful. This may allow the user to focus on the emergency situation rather than initiating repeated NOVES messages.

Additionally, the counter value of the NOVES message may allow the PSAP 128 to determine if the NOVES message has been previously received and/or if an emergency response team has been previously activated. This may prevent a duplicative emergency response team from being activated for the NOVES message. Furthermore, the counter value may give an indication to the PSAP 128 and/or the emergency response team of how much time has elapsed since the NOVES message was first initiated.

Figure 4:
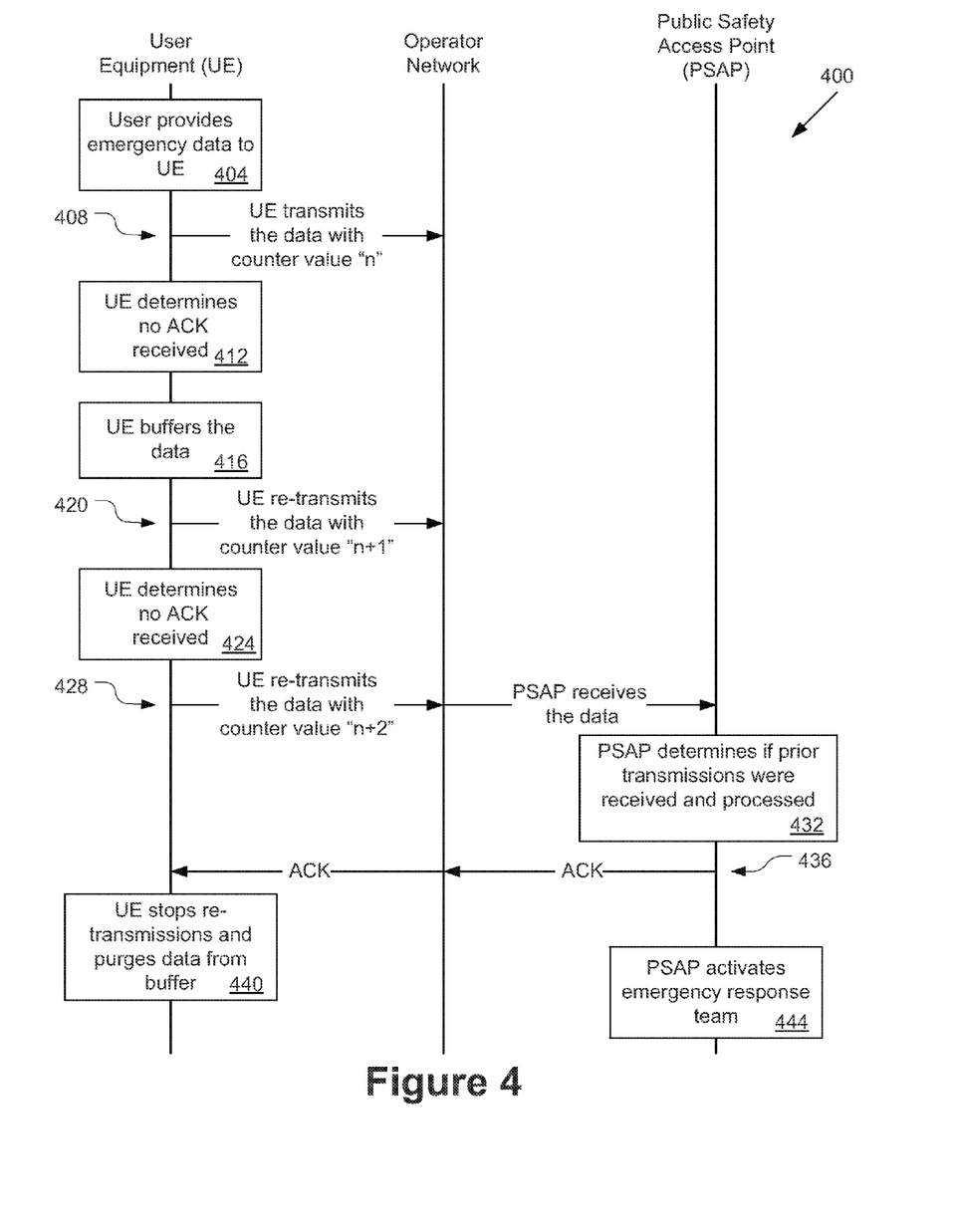
FIG. 4 is a flowchart of a method of managing non-voice emergency services (NOVES) in accordance with various embodiments.

FIG. 4 illustrates a method 400 in accordance with various embodiments. Various operations of the method 400 may be performed by a UE (e.g., UE 104), an operator network (e.g., operator network 108), and/or a PSAP (e.g., PSAP 128). In some embodiments, the UE may communicate with the PSAP via the operator network, as shown in FIG. 4. However, in other embodiments, the UE may communicate directly with the PSAP to perform the method 400. In some embodiments, the UE, operator network, and/or PSAP may include and/or have access to one or more computer-readable media having instructions stored thereon, that, when executed, cause the UE, operator network, and/or PSAP, respectively, to perform the respective operations of method 400.

At 404, a user of the UE may provide emergency data to the UE associated with an emergency situation. The emergency data may include, for example, one or more bits, text, audio, photo, and/or video. At 408, the UE may transmit the data in a NOVES message intended for the PSAP via the operator network. The NOVES message may include a counter value having an initial value "n." The PSAP may not receive the NOVES message, for example, due to a lack of coverage by the operator network or the PSAP, and/or traffic congestion on the operator network or PSAP. Accordingly, the PSAP may not transmit an ACK to the UE.

At 412, the UE may determine that no ACK has been received from the PSAP. For example, the UE may determine that no ACK has been received if the UE has not received an ACK within a time period from the transmission of the NOVES message at 408.

At 416, the UE may buffer the emergency data. In some embodiments, the emergency data may be buffered in response to the determination that no ACK has been received from the PSAP. In other embodiments, the UE may buffer the emergency data proactively, which may be prior to the determination at 412.

At 420, the UE may re-transmit the emergency data in a NOVES message having counter value "n+1" based on the determination at 412. At 424, the UE may determine that no ACK has been received from the PSAP for the NOVES message with counter value "n+1" or for the NOVES message with counter value "n."

At 428, the UE may re-transmit the data in a NOVES message having counter value "n+2" based on the determination at 424. The PSAP may receive the transmission at 428. The PSAP may detect that the counter value of the received NOVES message is greater than the initial value. Accordingly, at 432, the PSAP may determine that the prior transmissions (e.g., the transmissions having counter values of "n" or "n+1") of the emergency data were not received and/or processed by the PSAP or another PSAP. At 436, the PSAP may transmit an ACK to the UE. The UE may receive the ACK and, at 440 the UE may stop further re-transmissions of the emergency data. In some embodiments, the UE may additionally purge the data from the buffer.

At 444, the PSAP may activate an emergency response team based on the determination at 432. If the PSAP at 432 had instead determined that the emergency data had been previously received and a response team had already been activated, then the PSAP may not activate another response team.

It will be apparent that the order of operations of method 400 may be varied from that shown in FIG. 4.

Figure 5:
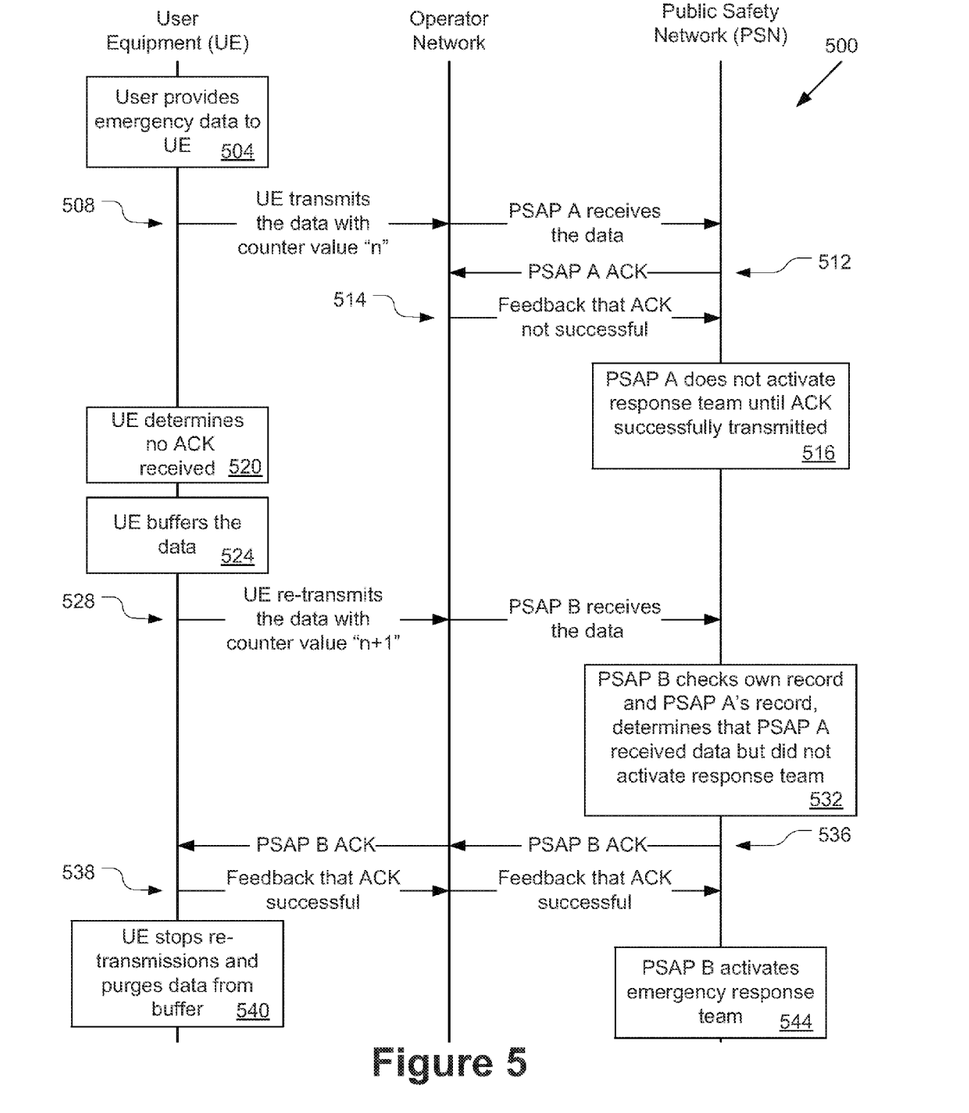
FIG. 5 is another flowchart of a method of managing NOVES in accordance with various embodiments.

FIG. 5 illustrates a method 500 in accordance with various embodiments. Various operations of the method 500 may be performed by a UE (e.g., UE 104), an operator network (e.g., operator network 108), and/or a public safety network (PSN). The public safety network may include a plurality of PSAPs including a first PSAP A and a second PSAP B. PSAP A and/or PSAP B may include similar components to PSAP 128. In some embodiments, the UE may communicate with the PSN via the operator network, as shown in FIG. 5. However, in other embodiments, the UE may communicate directly with the PSN to perform the method 500. In some embodiments, the UE, operator network, PSAP A and/or PSAP B may include and/or have access to one or more computer-readable media having instructions stored thereon, that, when executed, cause the UE, operator network, and/or PSAP, respectively, to perform the respective operations of method 500.

At 504, a user of the UE may provide emergency data to the UE associated with an emergency situation. The emergency data may include, for example, one or more bits, text, audio, photo, and/or video. At 508, the UE may transmit a NOVES message that includes the emergency data to the PSN via the operator network. The NOVES message may include a counter value having an initial value "n." PSAP A of the PSN may receive the NOVES message.

At 512, PSAP A may transmit an ACK to the UE. However, the UE may not receive the ACK (e.g., due to unavailability of the operator network due to lack of coverage and/or network congestion). At 514, the PSAP A may receive feedback that the ACK was not successfully transmitted to the UE. The feedback may be transmitted to the PSAP, for example, by the operator network. At 516, the PSAP A may not activate a response team until the ACK is successfully transmitted to the UE. However, in other embodiments, the PSAP A may activate a response team upon receiving the NOVES message and may not wait until the ACK is successfully transmitted to the UE.

At 520, the UE may determine that no ACK has been received for the NOVES message. At 524, the UE may buffer the emergency data, and at 528, the UE may re-transmit the emergency data in a NOVES message having an incremented counter value of "n+1." The NOVES message with the incremented counter value may be received by PSAP B. For example, the UE may have moved from the coverage area of PSAP A to the coverage area of PSAP B between the transmission of the NOVES message at 508 and the re-transmission of the NOVES message at 528.

At 532, PSAP B may check its own record and the record of PSAP A to determine if a prior transmission of the emergency data has been received and a response team has been activated. The PSAP B may also check the records of other PSAPs. In this case, PSAP B may determine that PSAP A previously received the emergency data but did not activate a response team. Accordingly, the PSAP B may activate an emergency response team at 544. If the PSAP A had previously activated a response team, PSAP B may not activate another response team.

At 536, PSAP B may transmit an ACK to the UE. The UE may receive the ACK. At 538, the PSAP B may receive feedback that the ACK was successfully received. The feedback may be transmitted, for example, by the UE and forwarded by the operator network. At 540, the UE may stop further re-transmissions and purge the emergency data from the buffer in response to receiving the ACK.

It will be apparent that the order of operations of method 500 may be varied from that shown in FIG. 5.

Figure 6:
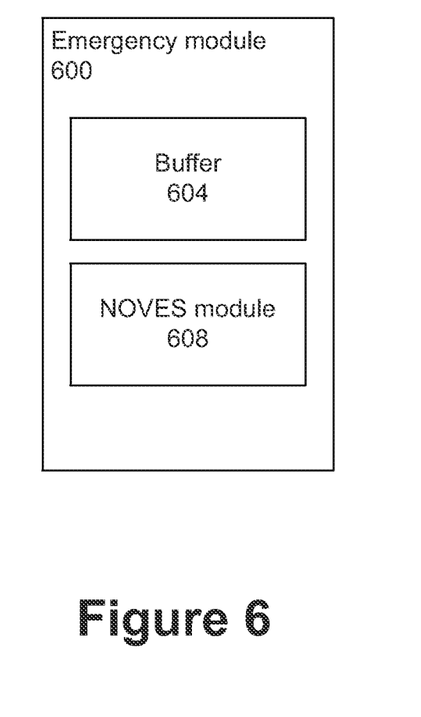
FIG. 6 is a block diagram illustrating an emergency module hosted in an operator network in accordance with various embodiments.

FIG. 6 illustrates an emergency module 600 that may be hosted in the operator network 108 in accordance with various embodiments. For example, the emergency module 600 may be included in the eNB 112, SGW 116, and/or PGW 120. Alternatively, or additionally, the emergency module 600 may be included in a NOVES proxy server 124 that is hosted in the operator network 108 and dedicated for NOVES operations.

The emergency module 600 may include a buffer 604 and a NOVES module 608 coupled to one another. In various embodiments, the NOVES module 608 may receive a NOVES message from a UE (e.g., UE 104). The NOVES message may include emergency data associated with an emergency situation. For example, the emergency data may include one or more bits, audio, photo, and/or video associated with the emergency situation.

In various embodiments, the NOVES module 608 may attempt to send (e.g., transmit) the NOVES message to a PSAP (e.g., PSAP 128), and may determine that the PSAP is unavailable (e.g., due to network congestion and/or other factors). In some embodiments, the NOVES module 608 may determine that the PSAP is unavailable based on a determination that an ACK has not been received from the PSAP.

In various embodiments, the NOVES module 608 may store the NOVES message in the buffer 604 in response to the determination that the PSAP is unavailable. The NOVES module 608 may thereafter re-attempt to send the NOVES message to the PSAP. In some embodiments, the NOVES module 608 may increment a counter value of the NOVES message as discussed herein. In other embodiments, the NOVES module 608 may not increment the counter value and/or the NOVES message may not include a counter value.

The NOVES module 608 may periodically re-attempt to send the NOVES message to the PSAP, for example, after a time interval from a most recent attempt. In some embodiments, the NOVES module 608 may make periodic re-attempts until the NOVES message is successfully received (e.g., the emergency module 600 receives an ACK) and/or until a time out period has elapsed from when the NOVES module 608 received the NOVES message.

In some embodiments, based on the determination that the PSAP is unavailable, the NOVES module may transmit, to the UE, a partial acknowledgement message indicating that the emergency module 600 has received the NOVES message and that the PSAP is unavailable. The partial acknowledgement may further indicate that the emergency module 600 will periodically re-attempt to send the NOVES message to the PSAP.

In some embodiments, the UE may stop a transmission re-attempt process, such as the method 400, in response to receiving the partial acknowledgement. Accordingly, the emergency module 600 may reduce traffic on the operator network from repeated transmissions of the NOVES message by the UE in situations when the operator network has received the NOVES message but the PSAP is unavailable.

In various embodiments, the NOVES module 608 may receive an ACK from the PSAP after a re-attempted transmission of the NOVES message indicating that the PSAP has received the NOVES message. The NOVES module 608 may then transmit to the UE a full acknowledgement indicating that the NOVES message has been received by the PSAP. The NOVES module 608 may further purge the NOVES message from the buffer 604 in response to the ACK.

Figure 7:
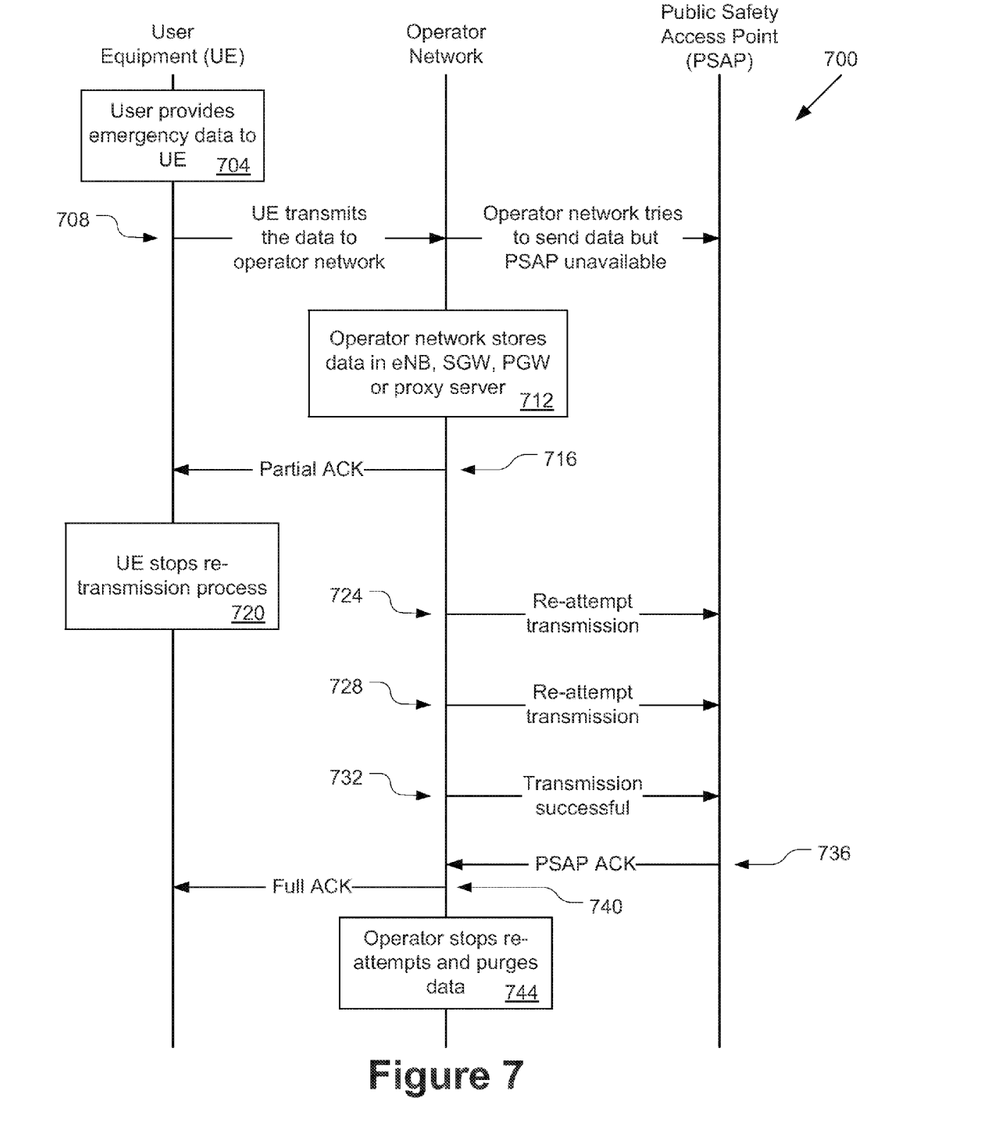
FIG. 7 is a flowchart of a method for reducing congestion in an operator network in accordance with various embodiments.

FIG. 7 illustrates a method 700 in accordance with various embodiments. Various operations of the method 700 may be performed by a UE (e.g., UE 104), an operator network (e.g., operator network 108), and/or a PSAP (e.g., PSAP 128). In some embodiments, the UE, operator network, and/or PSAP may include and/or have access to one or more computer-readable media having instructions stored thereon, that, when executed, cause the UE, operator network, and/or PSAP, respectively, to perform the respective operations of method 700.

At 704, the user may provide emergency data to the UE associated with an emergency situation. At 708, the UE may transmit the emergency data in a NOVES message to the operator network (e.g., to the eNB) for forwarding to the PSAP. The operator network may attempt to forward the NOVES message to the PSAP, but the PSAP may be unavailable.

At 712, the operator network may determine that the PSAP is unavailable and in response may store the emergency data in an eNB, SGW, PGW, or NOVES proxy server of the operator network. In some embodiments, the NOVES proxy server may be a dedicated server for storing NOVES data (e.g., when the PSAP is unavailable).

At 716, the operator network may transmit a partial acknowledgement to the UE indicating that the operator network has received the NOVES message, that the PSAP is unavailable, and that the operator network will periodically re-attempt transmission of the NOVES message.

At 720, the UE may stop a re-transmission process, as discussed herein, based on receiving the partial acknowledgement. The UE may or may not purge the emergency data from the local buffer in response to the partial acknowledgement.

At 724 and 728, the operator network may re-attempt to transmit the NOVES message to the PSAP, but the re-attempt may be unsuccessful. At 732, the operator network may successfully transmit the NOVES message to the PSAP.

At 736, the PSAP may transmit an acknowledgement to the operator network indicating that the PSAP has received the NOVES message. At 740, the operator network may transmit a full acknowledgement to the UE indicating that the PSAP has received the NOVES message. In some embodiments, the operator network may forward the acknowledgement received from the PSAP as the full acknowledgement. In other embodiments, the full acknowledgement may be a new message and/or include additional information.

At 744, the operator network may stop further re-attempts to send the NOVES message to the PSAP and may purge the emergency data from the buffer.

In some embodiments, the UE may cancel the NOVES message after receiving the partial acknowledgement and before receiving the full acknowledgement. For example, the emergency situation may be resolved, and the operator of the UE may want to stop further re-transmissions of the NOVES message to the PSAP. In that case, the UE may transmit a message to the operator network to stop further re-transmissions of the NOVES message.

Alternatively, or additionally, to including the emergency module 600 in the operator network to store and forward the NOVES message and/or performing method 700, the UE 104 may change the time interval between re-transmissions of the NOVES message by the UE 104 in response to receiving a partial acknowledgement from the eNB 112. For example, the eNB 112 may transmit a partial acknowledgement to the UE indicating that the eNB 112 has received the NOVES message and that the PSAP is unavailable. The partial acknowledgement may not indicate to the UE that the operator network 108 will store and re-transmit the NOVES message. Accordingly, the UE 104 may continue to periodically re-transmit the NOVES message as described herein.

The UE 104 may be configured to re-transmit the NOVES message after a first time interval has elapsed from a previous transmission if the UE 104 has not received an acknowledgement. However, the UE 104 may change the time interval between successive re-transmissions from the first time interval to a second time interval based on receiving the partial acknowledgment. In some embodiments, the second time interval may be longer than the first time interval. For example, the first time interval may have a value of $T_1$, and the second time interval may have a value of $T+T_2$. Alternatively, or additionally, the second time interval may be defined as a multiple of the first time interval (e.g., the first time interval may be $T_1$, and the second time interval may be kT, where k is greater than 1). The lengthened time interval between re-transmissions may reduce network traffic on the operator network 108 to reduce/prevent congestion. In various embodiments, the values and/or difference in values of $T_1$ and $T_2$ may be determined and/or adjusted by the operator network, the PSAPs, and/or regulations.

Figure 8:
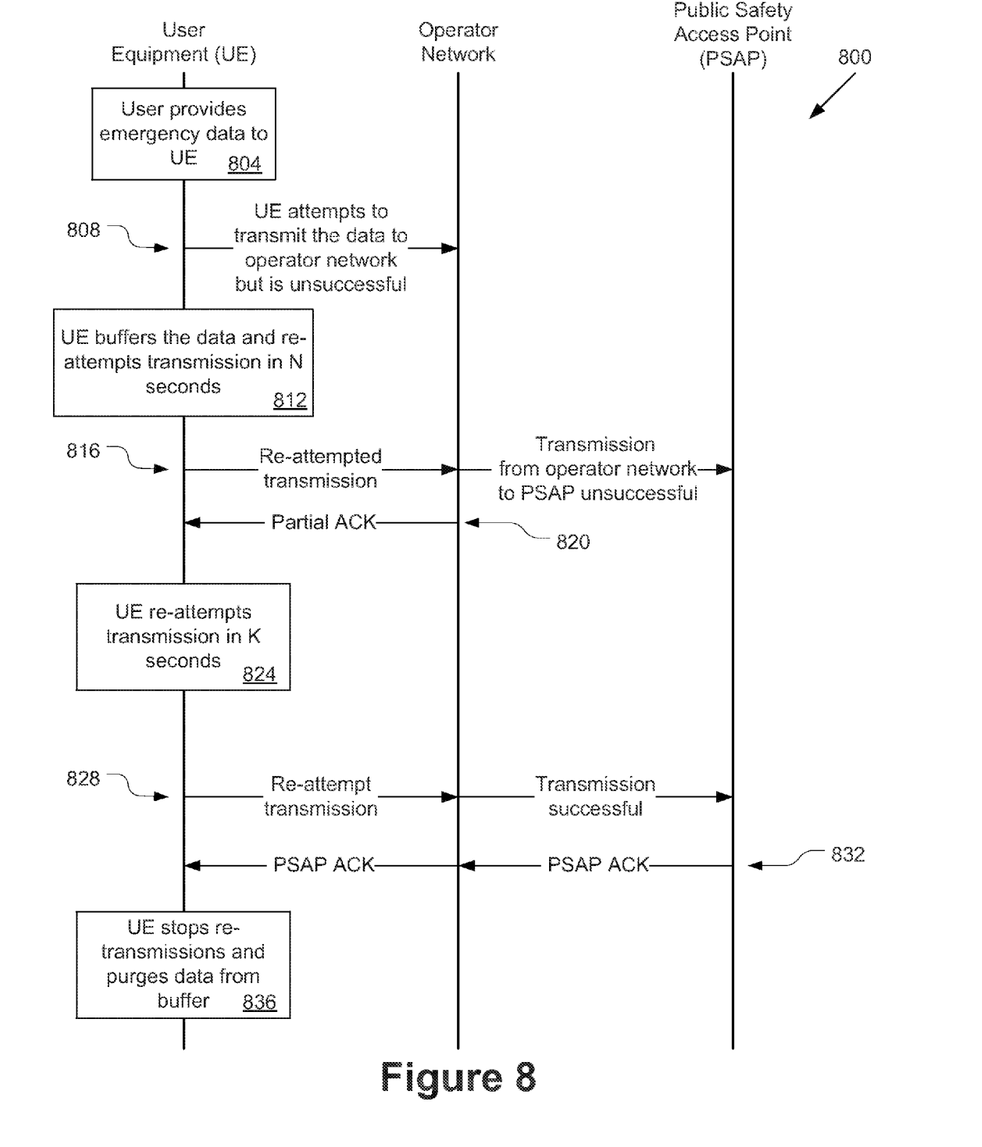
FIG. 8 is another flowchart of a method of reducing congestion in an operator network in accordance with various embodiments.

FIG. 8 shows a method 800 that may be used to manage network congestion from NOVES messages in accordance with some embodiments.

At 804, the user may provide emergency data to the UE associated with an emergency situation. At 808, the UE may transmit the emergency data in a NOVES message to the operator network (e.g., to the eNB) for forwarding to the PSAP. However, the operator network may not receive the NOVES message.

At 812, the UE may determine that the operator network is unavailable and initiate a re-transmission process in which the UE buffers the emergency data and re-transmits the emergency data every N seconds. At 816, a re-attempted transmission of the NOVES message by the UE may be successfully received by the operator network. However, the operator network may be unsuccessful in forwarding the NOVES message to the PSAP. Accordingly, at 820, the operator network (e.g., the eNB) may transmit a partial acknowledgement to the UE indicating that the operator network has received the NOVES message and the PSAP is unavailable.

At 824, the UE may modify the re-transmission process to re-attempt transmission of the NOVES message every K seconds in response to the partial acknowledgement. At 828, the UE may re-attempt transmission of the NOVES message, and the transmission may be successfully received by the PSAP (e.g., may be successfully forwarded by the operator network). At 832, the PSAP may transmit an ACK to the operator network, and the operator network may forward the ACK to the UE as a full acknowledgement indicating that the PSAP has received the NOVES message.

At 836, the UE may stop the re-transmission process and may purge the data from the buffer in response to receiving the ACK from the PSAP.

Figure 9:
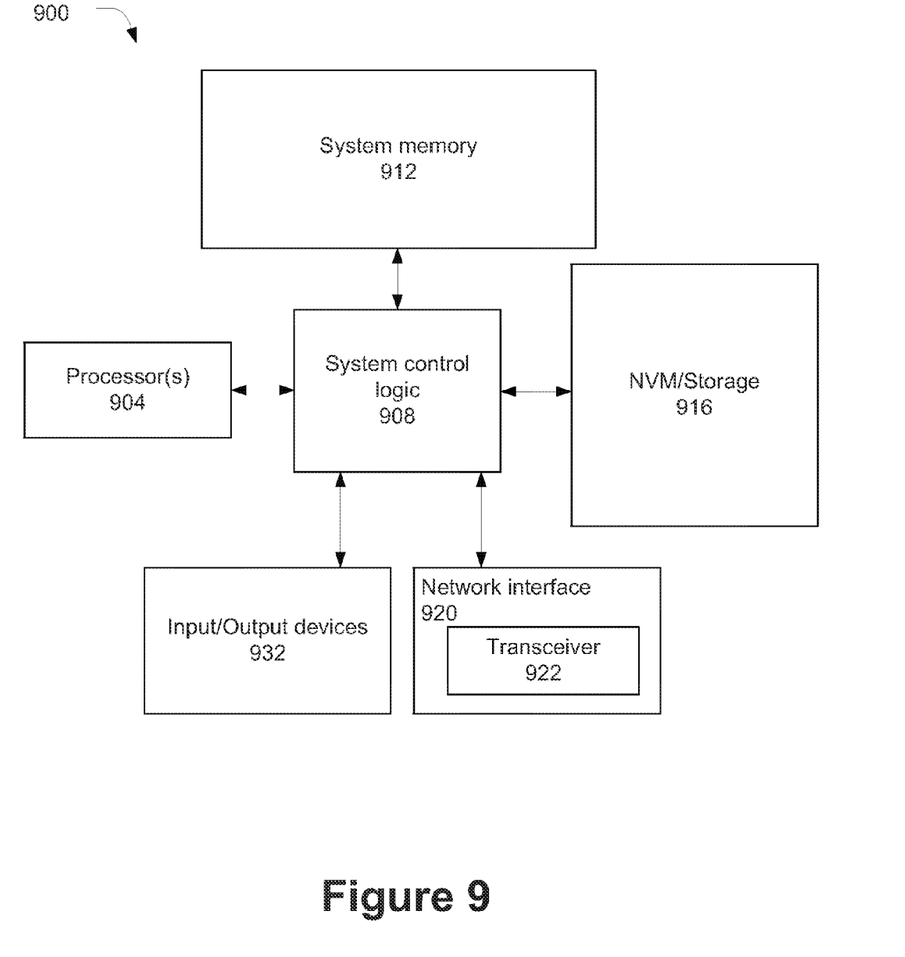
FIG. 9 is a block diagram illustrating an example computing system in accordance with various embodiments.

The UE 104, eNB 108, SGW 116, PGW 120, NOVES proxy server 124, and/or PSAP 128 described herein may be implemented into a system using any suitable hardware and/or software to configure as desired. FIG. 9 illustrates, for one embodiment, an example system 900 comprising one or more processor(s) 904, system control logic 908 coupled with at least one of the processor(s) 904, system memory 912 coupled with system control logic 908, non-volatile memory (NVM)/storage 916 coupled with system control logic 908, a network interface 920 coupled with system control logic 908, and input/output (I/O) devices 932 coupled with system control logic 908.

The processor(s) 904 may include one or more single-core or multi-core processors. The processor(s) 904 may include any combination of general-purpose processors and dedicated processors (e.g., graphics processors, application processors, baseband processors, etc.).

System control logic 908 for one embodiment may include any suitable interface controllers to provide for any suitable interface to at least one of the processor(s) 904 and/or to any suitable device or component in communication with system control logic 908.

System control logic 908 for one embodiment may include one or more memory controller(s) to provide an interface to system memory 912. System memory 912 may be used to load and store data and/or instructions, for example, for system 900. System memory 912 for one embodiment may include any suitable volatile memory, such as suitable dynamic random access memory (DRAM), for example.

NVM/storage 916 may include one or more tangible, non-transitory computer-readable media used to store data and/or instructions, for example. NVM/storage 916 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 916 may include a storage resource physically part of a device on which the system 900 is installed or it may be accessible by, but not necessarily a part of, the device. For example, the NVM/storage 916 may be accessed over a network via the network interface 920 and/or over Input/Output (I/O) devices 932.

Network interface 920 may have a transceiver 922 to provide a radio interface for system 900 to communicate over one or more network(s) and/or with any other suitable device. In various embodiments, the transceiver 922 may be integrated with other components of system 900. For example, the transceiver 922 may include a processor of the processor(s) 904, memory of the system memory 912, and NVM/Storage of NVM/Storage 916. Network interface 920 may include any suitable hardware and/or firmware. Network interface 920 may include a plurality of antennas to provide a multiple input, multiple output radio interface. Network interface 920 for one embodiment may include, for example, a wired network adapter, a wireless network adapter, a telephone modem, and/or a wireless modem.

For one embodiment, at least one of the processor(s) 904 may be packaged together with logic for one or more controller(s) of system control logic 908. For one embodiment, at least one of the processor(s) 904 may be packaged together with logic for one or more controllers of system control logic 908 to form a System in Package (SiP). For one embodiment, at least one of the processor(s) 904 may be integrated on the same die with logic for one or more controller(s) of system control logic 908. For one embodiment, at least one of the processor(s) 904 may be integrated on the same die with logic for one or more controller(s) of system control logic 908 to form a System on Chip (SoC).

In various embodiments, the I/O devices 932 may include user interfaces designed to enable user interaction with the system 900, peripheral component interfaces designed to enable peripheral component interaction with the system 900, and/or sensors designed to determine environmental conditions and/or location information related to the system 900.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 920 to communicate with components of a positioning network, e.g., a global positioning system (GPS) satellite.

In various embodiments, the system 900 may be a mobile computing device such as, but not limited to, a laptop computing device, a tablet computing device, a netbook, a smartphone, etc. In various embodiments, system 900 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof

What is claimed is:

1. An apparatus to be employed by a user equipment (UE), the apparatus comprising:
a buffer;
an emergency module configured to:
transmit a non-voice emergency services (NOVES) message over a wireless communication network to a public safety access point (PSAP), the NOVES message including emergency data associated with an emergency situation and a counter value indicating a number of times the NOVES message has been transmitted; and
store the emergency data in the buffer; and
an acknowledgement module coupled with the emergency module and configured to determine that an acknowledgement indicating that the PSAP has received the NOVES message has not been received;
wherein the emergency module, based on the determination by the acknowledgement module, is further configured to:
increment the counter value of the NOVES message; and
re-transmit the NOVES message with the emergency data and the incremented counter value over the wireless communication network.

2. The apparatus of claim 1, wherein the acknowledgement module is further configured to receive an acknowledgement indicating that the PSAP has received the NOVES message, and wherein the emergency module is further configured to purge the NOVES message from the buffer based on the receipt of the acknowledgement.

3. The apparatus of claim 1, wherein the emergency module is configured to transmit the NOVES message to the PSAP via an evolved Node B (eNB) of the wireless communication network.

4. The apparatus of claim 1, wherein the acknowledgement module is configured to notify the emergency module that an ACK has not been received for the NOVES message if an ACK has not been received after a time interval from a most recent transmission of the NOVES message.

5. The apparatus of claim 1, wherein the counter value is incremented to a maximum value, and wherein re-transmissions of the NOVES message, subsequent to the counter value having the maximum value, include the maximum value of the counter value.

6. The apparatus of claim 1, wherein the emergency data includes one or more bits, text, audio, a photo, or video associated with the emergency situation.

7. A public safety access point (PSAP) comprising:
an intake module configured to receive a non-voice emergency services (NOVES) message from a user equipment (UE) over a wireless communication network, the NOVES message including emergency data associated with an emergency situation and a counter value that is incremented from an initial value to indicate a number of times the NOVES message has been transmitted; and
a redundancy module configured to:
detect that the counter value is greater than the initial value; and
determine if the NOVES message has been previously received by the PSAP or another PSAP based on the detection.

8. The PSAP of claim 7, wherein the PSAP is configured to determine if emergency procedures has previously been activated in response to the NOVES message.

9. The PSAP of claim 8, wherein the PSAP is configured to activate emergency procedures based on a determination that emergency procedures have not been previously activated.

10. The PSAP of claim 7, wherein the PSAP is configured to transmit an acknowledgement the UE to indicate that the PSAP has received the NOVES message.

11. The PSAP of claim 7, wherein the redundancy module is configured to determine if another PSAP has previously received the emergency data by checking a record of one or more surrounding PSAPs.

12. An apparatus, comprising:
a buffer; and
a non-voice emergency services (NOVES) module coupled with the buffer and configured to:
receive a NOVES message from a user equipment (UE);
send the NOVES message to a public safety access point (PSAP);
determine that the PSAP is unavailable;

store the NOVES message in the buffer based on the determination;

re-send the NOVES message to the PSAP; and transmit to the UE, in response to the determination that the PSAP is unavailable, a partial acknowledgement indicating that the PSAP is unavailable and the apparatus will re-send the NOVES message to the PSAP.

13. The apparatus of claim 12, wherein the apparatus is an eNode B (eNB), a packet gateway, or a serving gateway of an operator network.

14. The apparatus of claim 12, wherein the apparatus is a proxy server that is hosted in an operator network and is dedicated for NOVES operations.

15. The apparatus of claim 12, wherein the UE is to stop a re-send process in response to receiving the partial acknowledgement.

16. The apparatus of claim 12, wherein the NOVES module is configured to:

receive, after the re-send, an acknowledgement that the PSAP has received the NOVES message; and transmit to the UE a full acknowledgement indicating that the NOVES message has been received by the PSAP.

17. The apparatus of claim 16, wherein the NOVES module is further configured to purge the NOVES message from the buffer in response to the acknowledgement that the PSAP has received the NOVES message.

18. The apparatus of claim 12, wherein the NOVES module is configured to re-send the NOVES message after a time interval from a most recent attempt.

19. The apparatus of claim 12, wherein the NOVES module is configured to determine that the PSAP is unavailable based on a determination that an acknowledgement from the PSAP has not been received.

20. One or more non-transitory computer-readable media having instructions, stored thereon, that, when executed, cause a user equipment (UE) to:

transmit a non-voice emergency services (NOVES) message to an evolved Node B (eNB) over a wireless communication network for forwarding to a public safety access point (PSAP);

store the NOVES message;

re-transmit the NOVES message to the eNB after a first time interval from the transmission if an acknowledgement is not received indicating that the NOVES message has been received;

receive a partial acknowledgement from the eNB indicating that the eNB has received the NOVES message and the PSAP is unavailable; and re-transmit, based on the receipt of the partial acknowledgement, the NOVES message to the eNB after a second time interval from a most recent transmission, wherein the second time interval is different from the first time interval.

21. The one or more media of claim 20, wherein the second time interval is longer than the first time interval.

22. The one or more media of claim 20, wherein the emergency module is further configured to:

receive a full acknowledgement indicating that the PSAP has received the NOVES message; and purge the NOVES message from the buffer in response to the receipt of the full acknowledgement.

* * * * *